(12) United States Patent
Hao et al.

(10) Patent No.: US 8,638,981 B2
(45) Date of Patent: Jan. 28, 2014

(54) PLACING TEMPORALLY ALIGNED AND VARIABLY SIZED PIXELS IN DISCRETE RINGS IN A GRAPHICAL VISUALIZATION

(75) Inventors: Ming C. Hao, Palo Alto, CA (US);
Manish Marwah, Palo Alto, CA (US);
Sabastian Mittelstadt, Constance (DE);
Umeshwar Dayal, Saratoga, CA (US);
Cullen E. Bash, Los Gatos, CA (US);
Chandrakant Patel, Fremont, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 155 days.

(21) Appl. No.: 13/363,597

(22) Filed: Feb. 1, 2012

(65) Prior Publication Data

US 2013/0195312 A1 Aug. 1, 2013

(51) Int. Cl.
*G06K 9/00* (2006.01)
*G06T 11/20* (2006.01)

(52) U.S. Cl.
USPC .............................. 382/100; 382/305; 345/440

(58) Field of Classification Search
USPC ......... 382/100, 162, 168, 173, 181, 189, 194, 382/232–235, 254, 274, 276, 286–294, 305, 382/312; 345/440; 340/870.11; 715/771
See application file for complete search history.

(56) References Cited

U.S. PATENT DOCUMENTS

| | | | |
|---|---|---|---|
| 8,022,952 B2 * | 9/2011 | Hao et al. ........................ 345/440 |
| 8,068,104 B2 * | 11/2011 | Rampersad .................... 345/440 |
| 8,184,016 B2 * | 5/2012 | Gray et al. ............... 340/870.11 |
| 2006/0053005 A1 | 3/2006 | Gulati | |
| 2008/0229226 A1 * | 9/2008 | Rowbottom et al. ......... 715/771 |
| 2009/0289809 A1 | 11/2009 | Gray | |
| 2011/0072378 A1 * | 3/2011 | Nurminen et al. ............ 715/771 |
| 2011/0148773 A1 | 6/2011 | Rudolph | |
| 2011/0184575 A1 | 7/2011 | Kawamoto | |

OTHER PUBLICATIONS

Ming C. Hao et al., U.S. Appl. No. 13/456,297 entitled Smoothed Visualization having rings containing pixels representing unevenly spaced data filed Apr. 26, 2012 (26 pages).
Bostock, Michael, Protovis: A Graphical System for Visualization, Mar. 2009 (10 pages).
Barnett, V., The Ordering of Multivariate Data, Journal of the Royal Statistical Society. Series A (General), vol. 139, No. 3 (1976), pp. 318-355.
Zaixian Xie, Towards Exploratory Visualization of Multivariate Streaming Data, Oct. 2007 (2 pages).
Asadi et al., Abstract—Expert Systems with Applications: An International Journal, vol. 39, Issue, 5, A new hybrid for improvement of auto-regressive integrated moving average models applying particle swarm optimization, Apr. 2012 (1 page).
Ming C. Hao et al., U.S. Appl. No. 13/450,598 entitled Providing a Correlation Ring for Indicating Correlation Between Attributes filed Apr. 19, 2012 (23 pages).
Tominski et al., Enhanced Interactive Spiral Display, Proceedings of the Annual SIGRAD Conference, Special Theme: Interactivity, pp. 53-56. Linköping University Electronic Press (2008).

* cited by examiner

*Primary Examiner* — Seyed Azarian (57) ABSTRACT

Data points contain data values in respective time intervals. Pixels representing data points for time periods (each time period including multiple time intervals) are placed in corresponding discrete rings in a graphical visualization, wherein the pixels are user accessible to allow viewing of information of the corresponding data points. The pixels are temporally aligned in the corresponding discrete rings, and the pixels in the corresponding discrete rings are variably sized depending on a number of data points in the respective time periods.

18 Claims, 6 Drawing Sheets
(3 of 6 Drawing Sheet(s) Filed in Color)

PLACING TEMPORALLY ALIGNED AND VARIABLY SIZED PIXELS IN DISCRETE RINGS IN A GRAPHICAL VISUALIZATION

BACKGROUND

An enterprise can collect a relatively large amount of data points over time. Such data points can be visualized in graphical visualizations. However, visualizing relatively large amounts of data points can be associated with various challenges.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments are described with respect to the following figures.

DETAILED DESCRIPTION

An enterprise (e.g. business concern, educational organization, government agency, individual, etc.) can collect a relatively large amount of data points. For example, an enterprise can receive measurements from various monitoring devices in a system such as a network of devices, a data center, a system of storage devices, and so forth. The collected measurements can include performance measurements, such as utilization of computer servers, utilization of storage devices, data rates through communication devices, and so forth. In other examples, data points can include other types of data, such as financial data (e.g. revenue, profit, etc.) of the enterprise, user feedback (expressing user sentiments regarding a product or service offering, for example) collected by the enterprise, data relating to a physical infrastructure (e.g. power utilization, water utilization, etc.), and so forth.

A data point can generally refer to a representation of data that can have one or multiple attributes. One example of an attribute can be a time attribute, which can indicate a time associated with the data point (e.g. time that the data was acquired or received). Another attribute can represent a value that is being measured, such as processor utilization, storage utilization, data rate, profit, revenue, user sentiment, and so forth.

In some cases, it may be desirable to visualize patterns in the data points over time. Recognizing such patterns over time in a relatively large volume of data points can be challenging. In accordance with some implementations, a graphical visualization is provided that includes discrete annular rings of pixels, where the pixels represent corresponding data points in respective time intervals (e.g. a time interval can be a measurement interval during which a measurement can be taken to provide a value of a data point). Note that an annular ring can be generally circular in shape. Alternatively, an annular ring can have a different shape, such as a rectangular shape, a polygon shape, and so forth. Note also that each discrete annular ring of the graphical visualization corresponds to a respective time period, where a time period is made up of multiple time intervals. As a specific example, a time period corresponding to a discrete annular ring can correspond to a day, whereas a time interval corresponding to a pixel can be a minute. A graphical visualization that includes discrete annular rings of pixels can also be referred to as a "tree-ring" graphical visualization, since the discrete annular rings are similar to tree rings that appear in a trunk of a tree, where the rings are built up over time.

Figure 1:
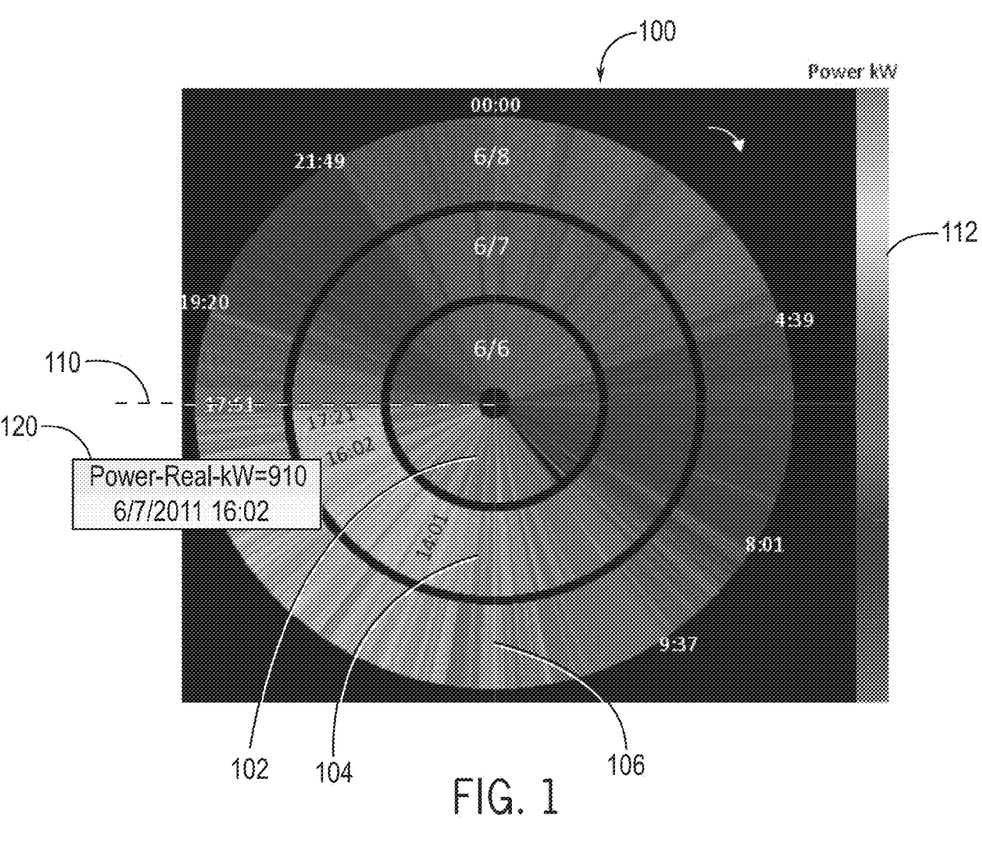
FIG. 1 illustrates an example graphical visualization that includes discrete rings of pixels, according to some implementations.

An example tree-ring graphical visualization 100 is depicted in FIG. 1. The graphical visualization 100 includes multiple discrete annular rings 102, 104, and 106, where the multiple discrete annular rings 102, 104, and 106 correspond to different time periods (e.g. different days). A set of data points (which can include a historical data set previously collected or data points that are being continually acquired) can be divided into multiple time periods, where each time period can correspond to a corresponding one of the discrete annular rings of the graphical visualization 100. As shown in FIG. 1, time labels (e.g. 6/6, 6/7, and 6/8) are added to the annular rings 102, 104, and 106 to identify the time periods associated with the annular rings.

For example, the innermost annular ring 102 can contain pixels representing data points for a first day, the intermediate annular ring 104 can contain pixels representing data points for a second day (after the first day), and the outermost annular ring 106 can contain pixels representing data points for a third day (after the second day). Although three annular rings are depicted in FIG. 1, note that in other examples, the graphical visualization 100 can include less than three annular rings or more than three annular rings. Moreover, as additional data points are received and added to the graphical visualization 100, additional annular rings can be added to the graphical visualization 100. For example, a fourth annular ring can be added outside the third annular ring to represent data points for a fourth day (after the third day).

Although FIG. 1 shows discrete annular rings for corresponding different days, it is noted that in other examples, the discrete annular rings can correspond to different time periods, such as hours, weeks, months, years, and so forth.

Within each annular ring, the pixels are temporally arranged according to the time attribute of the data points being represented by the annular ring (the annular ring represents a time period, such as a day). Pixels in different annular rings are temporally aligned (as discussed further below). Each pixel can represent a data point for a particular time interval (e.g., a minute)—this time interval represented by each pixel has a different time length than that of the time period represented by an annular ring (a time period includes multiple time intervals). Assuming that each annular ring represents a day, then there can be 1,440 pixels (24×60) in each annular ring, to represent the 1,440 minutes within each day. In a different example, each pixel can represent a data point for an hour—in such example, an annular ring would include 24 pixels, to represent the 24 hours within each day. It is noted that tree-ring graphical visualizations depicting corresponding different data sets (having different numbers of data points) can have different time intervals corresponding to pixels. Techniques or mechanisms according to some implementations can automatically perform temporal alignment of the pixels for each data set without user involvement.

Additionally, the pixels across different annular rings are temporally aligned such that along a given radial axis in the graphical visualization 100, the pixels in the different annular rings 102, 104, and 106 represent the same time interval. For example, temporally aligning the pixels along a radial axis across different annular rings can refer to the fact that the pixels in the different annular rings along the radial axis represent data points in different days at the same minute. For example, a radial axis 110 depicted in FIG. 1 can correspond to the $51^{st}$ minute of hour 17 (17:51). The pixels in the three discrete annular rings 102, 104, 106 that are along the radial axis 110 represent data points for hour 17, minute 51 (17:51) on three consecutive days.

The pixels in the annular rings 102, 104, and 106 are assigned corresponding visual indicators, which can be colors as shown in FIG. 1. A color scale 112 is depicted in FIG. 1 and maps different colors to different values of the attribute that is being depicted. In the example graphical visualization 100 of FIG. 1, the attribute that is being visualized is a power attribute (in kilowatts or kW). Different power values are assigned different colors in the color scale 112. The pixels depicted in the different annular rings 102, 104, and 106 are assigned different colors according to different values of the power attribute at respective time intervals. In other examples, visual indicators assigned to pixels can be for another attribute. Moreover, instead of using different colors, other types of visual indicators can be assigned to pixels, such as different graphical patterns, different gray levels, and so forth.

FIG. 1 also shows that the three annular rings 102, 104, and 106 are separated from each other by visible boundaries, in the form of dark circles between the annular rings. This allows a user to easily recognize groups of pixels for corresponding different time periods represented by the respective annular rings.

As further shown in FIG. 1, a user can select a particular pixel to obtain additional information regarding the pixel. For example, when a user moves a cursor over a particular pixel, a pop-up box 120 can be created to depict additional information regarding the selected pixel. More generally, the pixels in the tree-ring graphical visualization 100 are user accessible to allow user viewing of additional information of the corresponding data point. Additionally, a user can zoom into a particular portion of the tree-ring graphical visualization 100 to obtain a larger view of the portion.

FIGS. 2(a)-2(d) illustrate a real-time construction of the graphical visualization 100 as data points are received. Pixels representing data points are considered to be added or placed in the graphical visualization 100 in real-time if the pixels are being added as the data points are received by a processing system.

Figure 2:
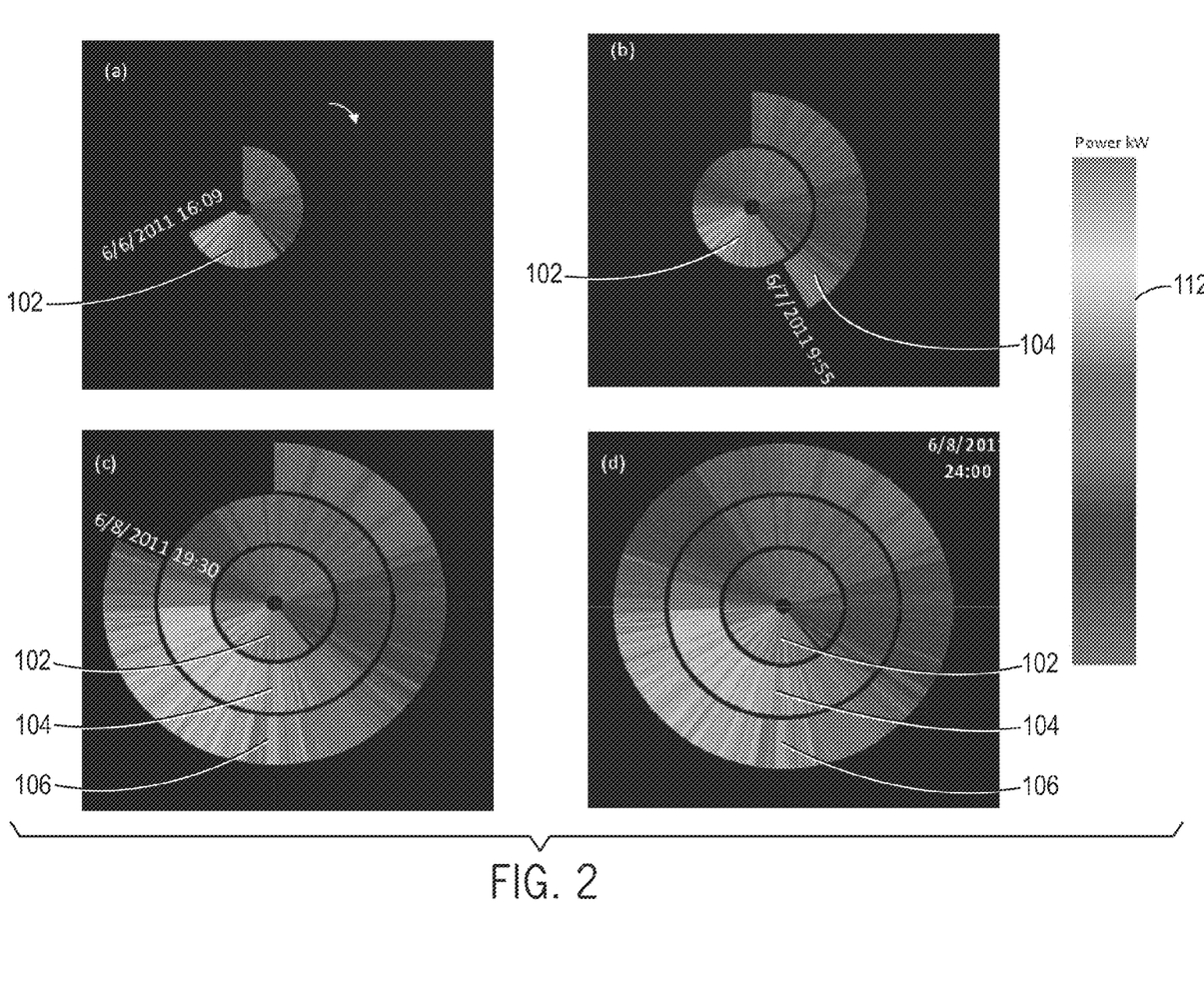
FIGS. 2(a)-2(d) illustrate example graphical representations including discrete rings of pixels as data points to show construction of tree rings in real-time with receipt of data, in accordance with some implementations.

FIG. 2(a) shows a partial construction of the innermost annular ring 102 containing pixels representing data points received so far for the first day. Placement of the pixels in the partial innermost annular ring 102 is according to a sequence based on the time attribute of the data points. As additional data points are received, the remaining pixels in the innermost annular ring 102 are placed. Once all pixels corresponding to the data points for the first day are placed in the innermost annular ring 102, the second annular ring 104 is created to place pixels for data points in the second day. FIG. 2(b) shows a partial construction of the second annular ring 104. FIG. 2(c) shows completion of the second annular ring 104, followed by the partial creation of the third annular ring 106.

FIG. 2(d) depicts the completion of the third annular ring 106 after all the corresponding data points for the third day have been received.

As additional data points are received, additional annular rings can be added to the graphical visualization 100.

Figure 3:
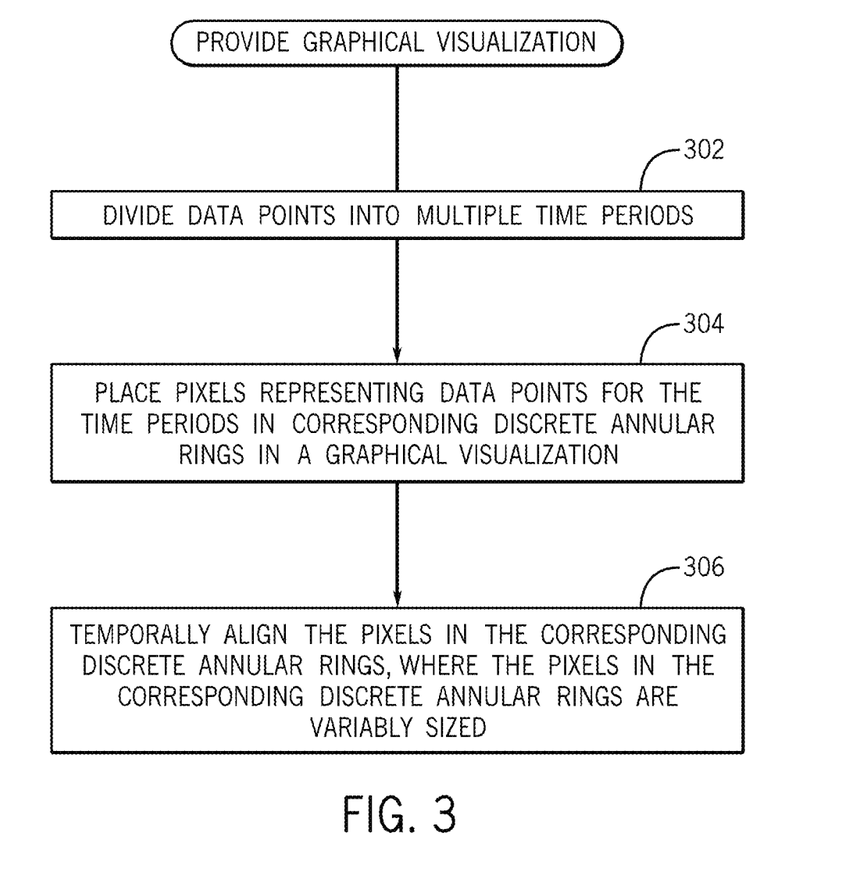
FIG. 3 is a flow diagram of a process of providing a graphical visualization, according to some implementations.

FIG. 3 is a flow diagram of a process of providing a tree-ring graphical visualization according to some implementations. The process divides (at 302) data points into multiple time periods, where each time period includes its respective subset of data points. The data points contain data values in respective time intervals (e.g. measurement intervals). As noted above, each time period includes multiple time intervals. The process then places (at 304) pixels representing data points in the multiple time periods in corresponding discrete annular rings in a graphical visualization, such as in the annular rings 102, 104, and 106 of the graphical visualization of 100 of FIG. 1. The pixels in the corresponding discrete annular rings are temporally aligned (at 306) such that pixels along a given radial axis in the graphical visualization correspond to data points for the same time point (e.g. same time) in different time periods (e.g. different days). Additionally, the pixels in the corresponding discrete annular rings are variably sized depending on a number of data points in the respective time periods. Stated differently, the size of pixels in each annular ring depends on the number of data points to be represented in the annular ring. The different annular rings each includes the same number of pixels. Additionally, the size of pixels in a first annular ring differs from the size of pixels in a second, different annular ring.

Figure 4:
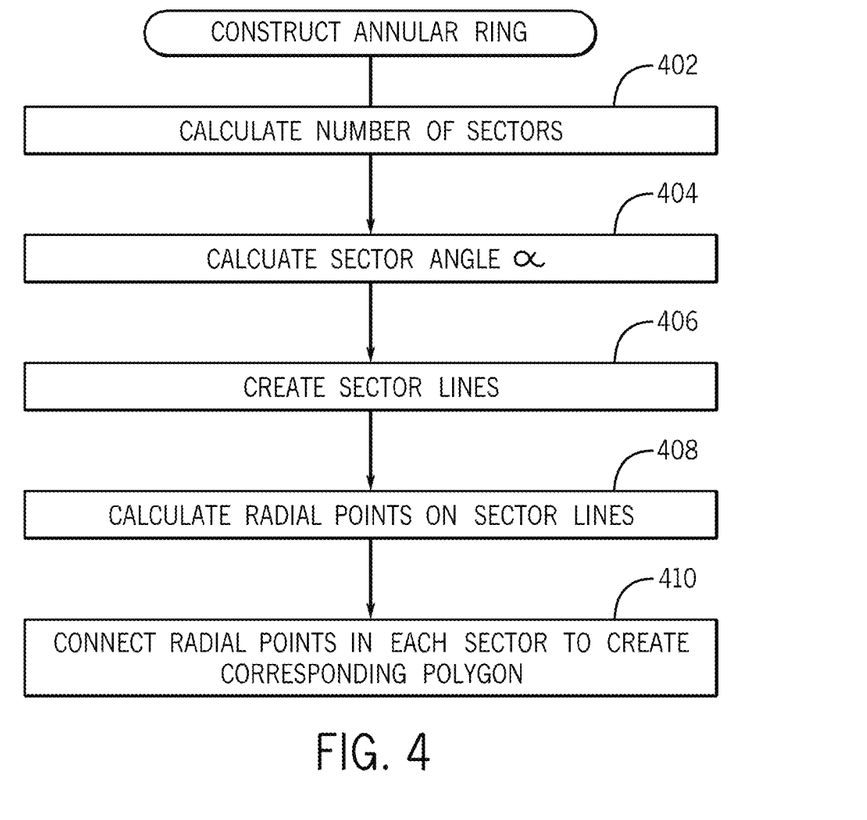
FIG. 4 is a flow diagram of a process of constructing a discrete ring in a graphical visualization according to some implementations.
Figure 5:
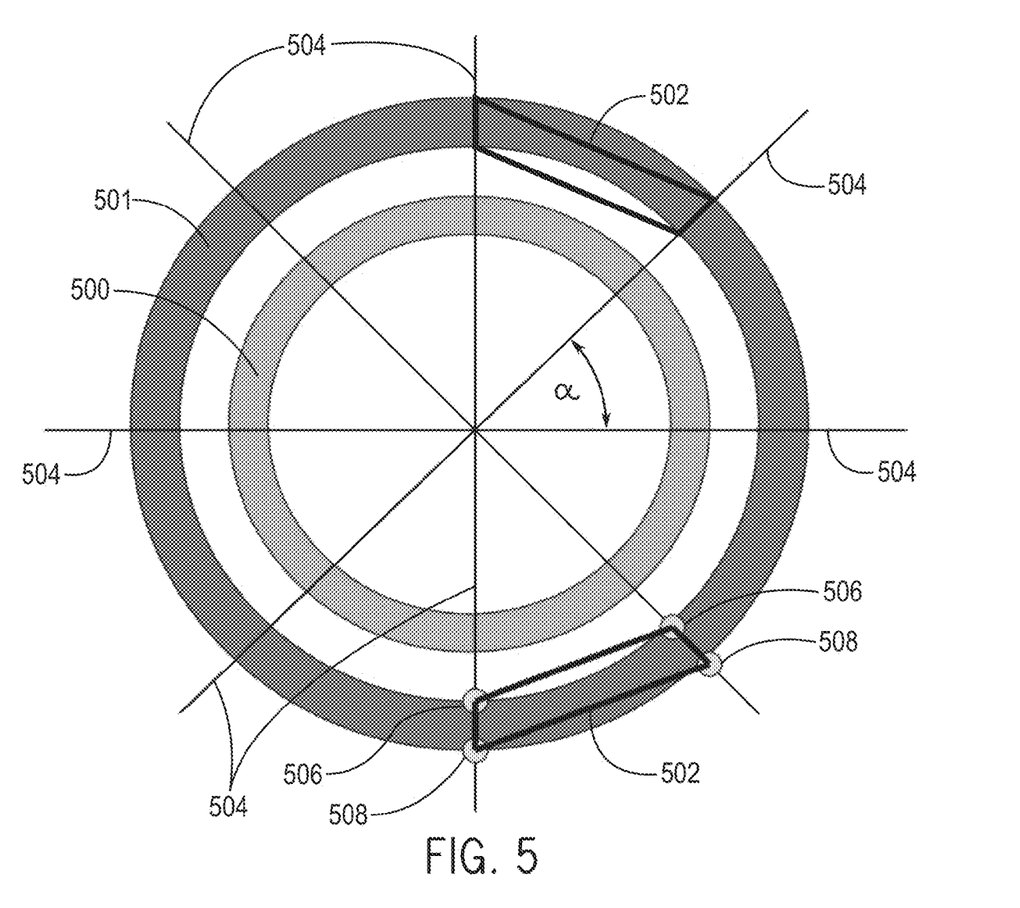
FIG. 5 illustrates parameters associated with discrete rings of a graphical visualization according to some implementations.

FIG. 4 is a flow diagram of a process of constructing an annular ring according to some implementations. Reference is also made to FIG. 5 in the discussion of FIG. 4, where FIG. 5 shows two example annular rings 500 and 501 along with various parameters associated with each annular ring.

The process of FIG. 4 calculates (at 402) a number of sectors for each annular ring (note that both annular rings 500 and 501 would include the same number of sectors). Each sector is represented generally by a polygon 502 in FIG. 5. Each polygon 502 defines generally the area in which a corresponding pixel in the annular ring 501 is located. The number of sectors 502 depends upon the number of pixels to be included in the annular ring. Based on the number of sectors 502 to be included in the annular ring, the process calculates (at 404) the sector angle (represented as ∝) The sector angle is the same for each of the sectors for the annular ring.

The FIG. 4 process further creates (at 406) sector lines 504 that define a sector 502. Each sector 502 is defined between two adjacent sector lines 504. The FIG. 4 process also calculates (at 408) two radial points 506 and 508 along each sector line 504 for each corresponding annular ring. The two radial points 506 and 508 define the width of an annular ring, which in the example in FIG. 5 is annular ring 501. The points 506, 508 on the sector lines 504 are connected together (at 410) to form a polygon 502.

In FIG. 5, each annular ring 500 or 501 includes eight pixels (which correspond to the eight sectors defined by the sector lines 504 of FIG. 5). In total, the two annular rings 500 and 501 include 16 pixels.

The process of FIG. 4 is repeated for each of the other annular rings. Note that each of the annular rings of the graphical visualization includes sectors having the same sector angle ∝, and sharing the same sector lines 504.

By using tree-ring graphical visualizations according to some implementations, a user can be able to quickly visually compare patterns across different time periods, to identify any events or issues that may have to be addressed or corrected. User interaction is possible with respect to the tree-ring graphical visualization to obtain further information regarding particular pixels, to aid in identifying a cause of an issue or event.

Figure 6:
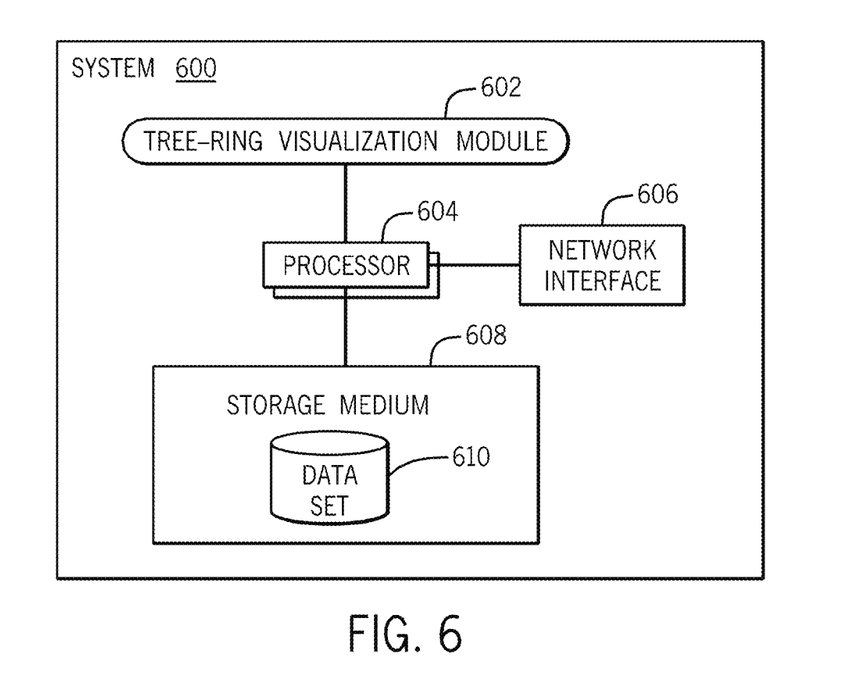
FIG. 6 is a block diagram of an example system incorporating some implementations.

FIG. 6 is a block diagram of an example system 600 that includes a tree-ring visualization module 602 executable on one or more processors 604. A processor can include a microprocessor, microcontroller, processor module or subsystem, programmable integrated circuit, programmable gate array, or another control or computing device.

The tree-ring visualization module 602 is able to perform processes discussed above, including processes of FIGS. 3 and 4, for example. The processor(s) 604 can be connected to a network interface 606 to communicate over a network and can be connected to a storage medium (or storage media) 608. The storage medium (or storage media) 608 can store a data set 610, such as a data set of data points. Data set 610 can be a historical dataset that was previously acquired, or alternatively, the data set 610 can include data points that are continually received by the system 600, where such continually-received data points are visualized in real-time using the tree-ring visualization module 602.

The storage medium or storage media 608 can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method executed by a computer, comprising dividing data points containing data values in respective time intervals into a plurality of time periods, where each of the time periods includes multiple time intervals;
   placing pixels representing data points for the plurality of time periods in corresponding discrete rings in a graphical visualization, wherein the pixels are user accessible to allow viewing of information of the corresponding data points; and
   temporally aligning the pixels in the corresponding discrete rings, wherein the pixels in the corresponding discrete rings are variably sized depending on a number of data points in the respective time periods, and wherein temporally aligning the pixels in the
discrete rings comprises temporally aligning the pixels according to a time attribute of the data points.

2. The method of claim 1, further comprising:
   receiving the data points over time;
   wherein the placing is performed in real-time as the data points are received.

3. The method of claim 1, further comprising:
   assigning visual indicators to the pixels according to values of an attribute of the corresponding data points.

4. The method of claim 3, wherein assigning the visual indicators comprises assigning different colors according to corresponding different values of the attribute.

5. The method of claim 1, wherein temporally aligning the pixels in the discrete rings comprises arranging the pixels in the discrete rings such that pixels along a particular radial axis in the graphical visualization are for a same time interval in different ones of the plurality of time periods.

6. The method of claim 1, further comprising:
   determining a pixel size of the pixels in a particular discrete ring corresponding to a particular time period, wherein the pixel size is based on the number of data points in the particular time period.

7. The method of claim 1, further comprising:
   receiving user input to select a given one of the pixels,
   wherein selection of the given pixel causes further information about the given pixel to be displayed.

8. The method of claim 1, wherein the pixels within a first one of the discrete rings have a first common pixel size, and wherein the pixels within a second one of the discrete rings have a second common size different from the first common pixel size.

9. The method of claim 1, further comprising adding time labels to the discrete rings.

10. An article comprising at least one computer-readable storage medium storing instructions that upon execution cause a system to:
    receive data points over time, wherein the data points contain data values in respective time intervals;
    generate a graphical visualization that includes a plurality of discrete annular rings that correspond to respective different time periods, each of the time periods including multiple time intervals; and
    provide pixels representing the data points in the different time periods in corresponding ones of the annular rings, wherein the providing includes variably defining a pixel size of the pixels within a given one of the annular rings depending on a number of pixels to be placed in the given annular ring, and temporally aligning the pixels in the annular rings according to a time attribute of the corresponding data points.

11. The article of claim 10, wherein the instructions upon execution cause the system to further:
    provide boundaries between the annular rings.

12. The article of claim 10, wherein the instructions upon execution cause the system to further:
    arrange pixels within a given one of the annular rings according to time intervals corresponding to the pixels, wherein the time intervals are of different time length than that of the time periods.

13. The article of claim 10, wherein the instructions upon execution cause the system to further assign different colors to the pixels according to different values of a second attribute of the data points.

14. The article of claim 10, wherein temporally aligning the pixels in the annular rings comprises arranging the pixels in the annular rings such that pixels along a particular radial axis in the graphical visualization are for a same time interval in different ones of the plurality of time periods.

15. The article of claim 10, wherein the instructions upon execution cause the system to further:
    determine a pixel size of the pixels in a particular annular ring corresponding to a particular time period, wherein the pixel size is based on a number of data points in the particular time period.

16. A system comprising:
    at least one processor to:
    divide data points containing data values in respective time intervals into a plurality of time periods, where each of the time periods includes multiple time intervals;
    place pixels representing data points for the plurality of time periods in corresponding discrete rings in a graphical visualization, wherein the pixels are user accessible to allow viewing of information of the corresponding data points; and
    temporally align the pixels in the corresponding discrete rings, wherein the pixels in the corresponding discrete rings are variably sized depending on a number of data points in the respective time periods, and wherein temporally aligning the pixels in the discrete rings comprises temporally aligning the pixels according to a time attribute of the data points.

17. The system of claim 16, wherein the at least one processor is to temporally align the pixels in the discrete rings by arranging the pixels in the discrete rings such that pixels along a particular radial axis in the graphical visualization are for a same time interval in different ones of the plurality of time periods.

18. The system of claim 16, wherein the at least one processor is to further:
    determine a pixel size of the pixels in a particular discrete ring corresponding to a particular time period, wherein the pixel size is based on a number of data points in the particular time period.

\* \* \* \* \*